Patented Oct. 2, 1945

2,386,140

UNITED STATES PATENT OFFICE 2,386,140

WATER-REPELLENCY AGENTS AND PROCESSES OF MAKING AND USING THE SAME

Maurice Arthur Thorold Rogers, Blackley, Manchester, England, assignor to Imperial Chemical Industries Limited, a corporation of Great Britain No Drawing. Application July 27, 1939, Serial No. 286,944. In Great Britain July 29, 1938

7 Claims. (Cl. 260—295)

The present invention relates to the manufacture of new organic ammonium compounds and to their use in treating textile materials especially for the purpose of conferring water-repellent properties thereon.

According to the invention the new organic ammonium compounds are made by effecting combination between halogenomethyl compounds of the general formula

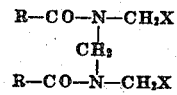

where R is an aliphatic hydrocarbon radical containing not less than 7 carbon atoms, and X is a halogen, and aliphatic or heterocyclic tertiary amines.

The compounds of the formula given being, as will be seen, derivatives of acids of formula R—CO—OH there come to be considered as suitable acids of that formula, the acids of vegetable and animal fats and oils, and products of their hydrogenation. There may be mentioned, for example, caprylic, pelargonic, capric, lauric, myristic, palmitic, oleic, stearic and montanic acids and also mixtures of these and similar acids such as the mixtures of acids derived from coconut oil or palm kernel oils.

Thus as suitable halogenomethyl compounds of the formula given there may be mentioned, for example, di-(N-chloromethyl-stearamido)-methane, di-(N-chloromethyl-palmitamido) methane, di-(N-chloromethyl-oleylamido) methane, di-(N-chloromethyl-myristamido) methane, di-(N-chloromethyl-lauramido) methane, di-(N-chloromethyl-caprylamido) methane, di-(N-bromomethyl-stearamido) methane, di-(N-bromomethyl-oleylamido) methane, di-(N-bromomethyl-lauramido) methane and analogous chloromethyl and bromomethyl compounds derived from the mixed fatty acids, derived from vegetable or animal fats and oils, for instance coconut oil or palm kernel oil.

As suitable aliphatic or heterocyclic tertiary amines to be used in the process of the invention there may be mentioned, for example, trimethylamine, triethylamine, N:N-tetramethylethylenediamine, dimethylcyclohexylamine, diethylcyclohexylamine, pyridine, N-methylpiperidine and α-picoline.

In carrying the invention into practical effect the halogenomethyl compound and the tertiary amine are mixed, if desired in the presence of a solvent or diluent. The reaction is exothermic and it is desirable in some cases to apply cooling means to moderate its violence.

The new compounds are believed to be quaternary ammonium compounds. They are solids which are soluble in benzene, alcohol and chloroform and sparingly soluble in ether and acetone. They dissolve readily in water, forming solutions which foam on shaking. When these solutions are boiled the compounds are slowly decomposed, the solutions gradually losing their foaming power. When the compounds themselves are heated to temperatures above 100° C. they decompose rapidly, forming water-insoluble waxy substances.

The halogenomethyl compounds which are used as starting materials in this invention may conveniently be made by interaction of compounds of the formula

with dihalogenodimethyl ethers or with formaldehyde and a hydrogen halide, e. g. hydrogen chloride or hydrogen bromide or, in the case of the chlorides, with formaldehyde and phosgene. The compounds of formula

themselves may be made, for instance, by the process described in French Specification No. 782,330.

By a further feature of the invention the new quaternary salts are applied to textile materials which are of animal or vegetable origin or which are composed of regenerated cellulose or of cellulose esters or ethers to give them properties of softness or of softness and water-repellence, which are resistant to laundering or dry-cleaning treatments. This feature of the invention comprises impregnating the said textile materials with a solution or suspension of one or more of the said quaternary salts in water or a suitable organic liquid, and subsequently submitting the impregnated material to a short heat treatment at a temperature such that the quaternary salt undergoes decomposition.

The conditions for carrying out the impregnation vary according to the nature of the material to be treated, the nature and concentration of the impregnating fluid and the kind of finish desired. For convenience the compounds are usually applied from an aqueous medium, but if tightly woven fabrics are to be treated it is frequently advantageous to add to the bath a small proportion of alcohol or acetone to facilitate penetration of the fabric. It is also possible, though for many purposes undesirable on economic grounds, to use solutions in organic liquids such, for example, as benzene, ethanol, trichloroethylene, white spirit or mixtures of two or more such liquids. This method of working is advantageously used for the simultaneous dry-cleaning and reproofing of shower-proofed garments.

The concentration of the impregnating fluid to be used depends on the nature of the material to be treated and the kind of finish desired. In general it can be said that soft finishes which are only slightly water-repellent are obtained when the impregnating fluid contains about 0.05–0.2% of the treatment agent, and highly water-repellent and finishes are obtained when the concentration is about 0.5–3%. With tightly woven fabrics, rather stronger solutions are needed. It should be noted that these figures are based on the assumption that the impregnated material contains its own weight of the impregnating fluid; if it contains less, the concentration should be proportionately increased.

To prevent or minimise tendering when materials composed of cellulose or cellulose esters or ethers are treated with a quaternary salt of a strong acid, the impregnating fluid should preferably contain also an alkaline substance or a substance which has an acid-binding action. Alternatively such substances may be applied to the material separately, either before or after the impregnation with the quaternary salt. Suitable substances are, for example, pyridine, hexamethylene tetramine and salts of weak acids with ammonia, alkali metals or alkaline earth metals, such as ammonium acetate, sodium acetate or borax.

There may also be added to the treatment bath other textile finishing agents, for example, agents which will give a fuller or stiffer handle to the treated materials such as aluminium acetate, carragheen moss, gum tragacanth, waxes (in solution or suspension), aluminium stearate, or cellulose derivatives, for example, methyl, ethyl or glycol cellulose. Other water-repellent agents may likewise be added, particularly water-insoluble compounds closely related chemically to the new quaternary salts, for example, diacyldiaminomethanes or the products of their condensation with formaldehyde, for example, their methylol compounds. Many of these compounds appear to be dispersed in the treatment bath by the quaternary salt.

The treatment is carried out by padding or soaking the material in the impregnating fluid, removing surplus liquor by squeezing or hydroextracting, when necessary drying at a low temperature and then heating for a short time to a temperature sufficient to cause decomposition of the quaternary salt. To obtain the best results the material is finally given a light soap wash, preferably with the addition of a small proportion of ammonia or other alkali, to remove any undecomposed quaternary salt or buffer compounds, together with any water-soluble decomposition or reaction products.

The final heat treatment, conveniently to be called the "baking" treatment, is essential if the softness and water-repellence of the treated material are to be permanent, that is to resist laundering and dry-cleaning operations. Good softening and water-repellence may be obtained if the baking step is omitted, but they will not be permanent. The baking temperature should be between 90° and 200° C., preferably between 100° and 175° C. The time of baking depends on the temperature used and both depend, to some extent, on the nature of the material being treated. With thick or tightly woven fabrics a longer time of baking at a relatively low baking temperature should be used in order that the heating may be uniform, whereas fabrics of an open weave may safely be heated for a very short time at a higher temperature. By way of an example it can be said that for medium quality plain calico, suitable times and temperatures are 30 minutes at 100° C., 10 minutes at 130° C. or 1½ minutes at 150° C. The time of baking is preferably kept as short as possible to avoid tendering of the material.

When a hydroxylic solvent or carrying fluid is used, for example water or alcohol, it is desirable, when treating thick or tightly woven fabrics, to dry the impregnated material at a low temperature, for example, 30°–50° C., before subjecting it to the baking treatment. The temperature of drying is, however, of less importance than speed of drying and it is desirable that a brisk circulation of air around and, so far as is possible, through the fabric, is provided. The aim should be to give as little opportunity as possible for any interaction to take place between hot water or water vapour and the quaternary salt. Such interaction is detrimental to the final water-repellent finish. It may be noted, however, that, in respect of their stability to such possible decomposition by water during the process of application, the new quaternary salts are superior to those the use of which is described in British Specifications Nos. 466,817, 477,991, 493,920, 495,025, 497,856 and 498,287. With the new compounds (except when applied to thick or tightly woven fabrics), if there is provided a brisk circulation of air around and through the material, the drying step may be omitted, the impregnated material being heated forthwith at the baking temperature.

By a further feature of the invention the new quaternary salts may also be applied to textiles which are of vegetable origin or which are composed of regenerated cellulose in conjunction with compounds which are used in known manner to make such textiles crease-resistant. Textiles made crease-resistant by the known processes feel harsh to the touch and are stiffer than is desirable. It has been proposed to overcome this difficulty by the incorporation of softening agents but the known softening agents are unsuitable for this purpose because many of them are decomposed by the heat-treatment which is the final stage of the crease-proofing process and others, even if stable to the heat-treatment, are readily removed from the treated materials by laundering or dry-cleaning operations. By the process of the present invention there are provided textiles which are crease-resistant, water-repellent, soft and supple, readily falling into pleasing folds. Moreover, these properties are resistant to laundering and dry-cleaning operations.

The water-proofing and the crease-proofing processes both involve an impregnation of the material, usually from an aqueous bath, a drying at low temperature and a subsequent heating at a higher temperature and the two processes may be carried out simultaneously or separately and in either order.

Suitable crease-proofing processes are those in which there is formation of a synthetic resin in situ by impregnation of the fabric with a partly condensed resinous condensation product derived from an aldehyde or aldehyde-yielding substance and urea, thiourea or a urea or thiourea derivative or a phenol, or an amino derivative of 1:3:5-triazine or a substitution product thereof (for example, melamine) under neutral, acid or alkaline conditions, or with the components required to form such a resinous condensation product, and a subsequent heat treatment to insolubilise the resin. Such processes are described, for example, in British Specifications Nos. 291,473, 291,474, 304,900, 431,703, 449,243, 458,877, 466,015, 485,198.

In those processes wherein aldehyde condensation products of ureas or phenols are used, an acid or acid-yielding substance is used in the crease-proofing bath; if an aldehyde condensation product of an aminotriazine is used it can be omitted.

This feature of the invention therefore comprises the treatment of textiles which are of vegetable origin or which are composed of regenerated cellulose with solutions or suspensions of the new quarternary salts before or after or simultaneously with a treatment with a medium comprising resin-forming components or a partly-condensed resinous condensation product and, where necessary, an acid or acid-yielding substance, this process or processes being followed by drying, preferably at low temperature, and finally by a heat treatment at a temperature sufficient to cause decomposition of the quarternary salt and to insolubilise the resin.

The invention is illustrated but not limited by the following examples in which the parts are by weight.

Example 1

29 parts of distearyldiaminomethane (see French Specification 782,330), in powdered form, and 6 parts of paraformaldehyde are mixed with 150 parts of benzene. The mixture is heated at 60° C. and stirred. Dry hydrogen chloride is passed in until, when a test portion is cooled, no solid is seen to separate. The mixture is allowed to settle, and the benzene solution is removed from the lower aqueous layer. The benzene is distilled off, preferably under sub-atmospheric pressure. There is thus obtained a chloromethyl compound which is believed to have the formula

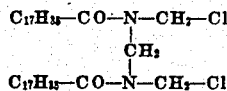

It is a low melting waxy solid, soluble in most organic solvents.

This is dissolved in 200 parts of ethyl acetate, and the solution is mixed with 9 parts of pyridine. A white precipitate is obtained. This is filtered off and dried. There is thus obtained a white powder which dissolves in hot water, forming clear foaming solutions which cease to foam on prolonged boiling, and which is also soluble in alcohol and in hot benzene and acetone.

The compound appears to have the formula

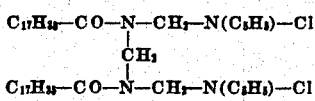

Example 2

To the chloromethyl compound prepared as described in Example 1 from 29 parts of distearyl-diaminomethane there are added 10 parts of triethylamine. Reaction occurs immediately with generation of heat and the mass becomes solid. It is then dissolved in 30 parts of chloroform, 500 parts of dry acetone are added and the liquid is cooled to below 0° C. A solid separates out. It is filtered off and dried in vacuo. It dissolves in water, benzene and alcohol. When heated to 100° C. it decomposes. It is believed to have the formula

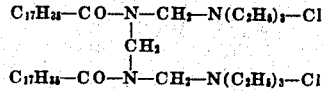

Example 3

The chloromethyl compound made as described in Example 1 from 29 parts of distearyldiaminomethane is dissolved in 100 parts of ethyl acetate and the solution is cooled to below 5° C. Gaseous trimethylamine is passed into this solution until a test sample removed from the reaction mixture remains alkaline for five minutes. During the passage of the gas a solid separates out. When the reaction is ended the solid is filtered off and dried. It is a white powder which is soluble in water and is believed to be the compound of formula

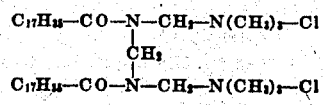

Example 4

28 parts of the compound of formula

R—CO—NH—CH₂—NH—CO—R wherein R has a meaning such that R—COOH stands for the mixed fatty acids derived from coconut oil. 8 parts of para-formaldehyde and 150 parts of benzene are heated together to 60° C. and a stream of dry hydrochloric acid gas is passed through the liquid. As the reaction proceeds water separates out, the benzene becomes turbid and eventually a separate aqueous layer is formed. When the benzene layer has become clear again (this shows that the formation of water has ceased) the gas stream is stopped, the layers are separated and the lower (aqueous) layer is rejected. The benzene is removed from the upper layer by distillation under diminished pressure. The chloromethyl compound remains. It is believed to have the formula

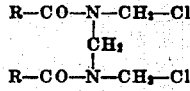

wherein R has the meaning given above.

This chloromethyl compound is mixed with 14 parts of pyridine. Reaction occurs, heat is generated and the mixture becomes solid. This solid is a water-soluble quaternary ammonium salt which is believed to have the formula

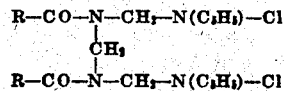

wherein R has the same meaning as before.

Example 5

Medium quality plain calico is padded in a solution of 20 parts of N:N-di-(N'-chloro-triethylammoniomethyl)-di-stearyl-diaminomethane of formula

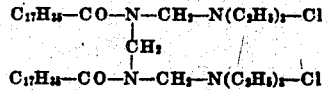

(conveniently made as described in Example 2) and 6 parts of crystalline sodium acetate in 1000 parts of water. The impregnated material is squeezed until it is double its initial weight, and is then heated for 10–15 minutes in a brisk current of air at 150° C. Finally it is washed for 5 minutes at 40° C. in a solution of 1 part of soap and 0.25 part of strong ammonia solution (sp. gr. 0.880) in 1000 parts of water, well rinsed and dried.

The cloth is now soft and highly water-repellent, the finish being risistant to laundering and dry-cleaning operations.

Example 6

A viscose rayon fabric is soaked in a solution of 1 part of N:N-di-(N'-chloro-triethylammoniomethyl)-distearyl-diaminomethane and 0.3 part of crystalline sodium acetate in 1000 parts of water. It is then squeezed until it is double its initial weight and dried at 60° C.

The fabric now has a soft handle and readily falls into pleasing folds.

If it is desired to make the finish resistant to washing and dry-cleaning, the dried fabric is heated for 2½ minutes at 150° C. Alternatively the drying step is omitted, the impregnated fabric being heated forthwith for 10–15 minutes in a brisk current of air at 150° C.

Example 7

A cellulose acetate fabric is padded at 35° C. in a solution containing 20 parts of N:N-di-(N'-chloro - triethylammoniomethyl) - distearyldiaminomethane and 6 parts of crystalline sodium acetate in 1000 parts of water. The impregnated material is squeezed until it is double its initial weight, dried at 50° C. and then heated for 2½ minutes at 140° C. Finally it is washed for 5 minutes at 40° C. in a solution of 1 part of soap and 0.25 part of strong ammonia solution (sp. gr. 0.880) in 1000 parts of water, well rinsed and dried.

The fabric is now soft and highly water-repellent, these properties being resistant to laundering and dry-cleaning operations.

Example 8

As Example 5, but treating a wool delaine material instead of the calico.

The woollen material is thereby made soft and highly water-repellent, these properties surviving laundering and dry-cleaning operations.

Example 9

A solution is made by dissolving 100 parts of urea in 200 parts of neutralise 40% aqueous formaldehyde solution to which is added 7.5 parts of concentrated ammonia solution (sp. gr. 0.880). The mixture is boiled for a few minutes and then rapidly cooled to room temperature. A cold aqueous solution of 6 parts of ammonium dihydrogen phosphate and 0.5 part of N:N-di-(N'-chloro - pyridinomethyl) -distearyldiaminomethane of the formula

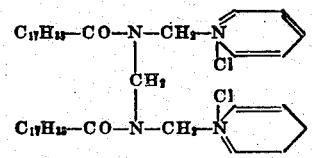

in 50 parts of water is now added and the whole is diluted to a total volume of 400 parts with cold water.

Spun viscose fabric is impregnated with this solution, squeezed and dried in a current of air at 40° C. and is then heated for 3 minutes at 140° C. Superfluous resin is removed by heating the fabric for 5 minutes at 50° C. in a solution containing 2 parts of soap and 1 part of sodium carbonate per 1000 parts of water. The fabric is then rinsed and dried.

The fabric is now soft and highly resistant to creasing. These properties survive laundering and dry-cleaning operations.

Example 10

100 parts of urea are dissolved in 200 parts of a neutralised 40% aqueous formaldehyde solution and 7.5 parts of ammonia (sp. gr. 0.880) are added. The mixture is boiled for a few minutes and then rapidly cooled to room temperature. 6 parts of ammonium dihydrogen phosphate dissolved in 50 parts of cold water are added and the whole is diluted with cold water to a total volume of 400 parts.

Spun viscose is impregnated with this solution, squeezed until it is double its initial weight, dried in a current of air at 40° C. and then heated for 3 minutes at 140 C. The so-treated fabric is then padded in a solution of 2 parts of N:N-di-(N'-chloro - pyridinomethyl) - distearyldiaminomethane and 0.6 part of crystalline sodium acetate per 100 parts of water, squeezed until it is double its dry weight, dried in a current of air at 40–50° C. and heated for 3 minutes at 140° C. Finally the material is washed for 5 minutes at 40° C. in a solution of 1 part of soap and 0.25 part of ammonia solution (sp. gr. 0.880) per 1000 parts of water, well rinsed and dried.

The fabric is soft, crease-resistant and water-repellent. These properties are not destroyed by laundering or dry cleaning operations.

Example 11

Viscose crepe fabric is impregnated with a solution of 20 parts of N:N-di-(N'-chloro-pyridionomethyl)-distearyldiaminomethane and 6 parts of crystalline sodium acetate in 1000 parts of water, squeezed till it is double its initial weight and then dried in a current of air at 50° C. The fabric is then impregnated with a solution containing urea, formaldehyde, ammonia and ammonium dihydrogen phosphate prepared as described in Example 10, squeezed until it is double its dry weight, dried at 50–60° C. and then heated for 3 minutes at 140° C. Finally the fabric is washed for 5 minutes at 50° C. in a solution of 2 parts of soap and 1 part of sodium carbonate per 1000 parts of water, well rinsed in warm water and dried.

The fabric is now soft, water-repellent and crease-resistant. These properties are not destroyed by laundering or dry cleaning treatments.

I claim:

1. Organic ammonium compounds, useful as water-repellent agents, of the formula

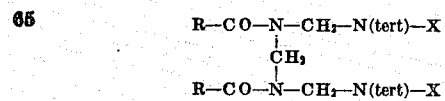

wherein R is an aliphatic hydrocarbon radical containing at least 7 carbon atoms, X is a halogen and N(tert) stands for a tertiary amine selected from the group consisting of aliphatic and heterocyclic tertiary amines.

2. Process for the manufacture of new organic ammonium compounds which comprises causing a halogenomethyl compound of the formula

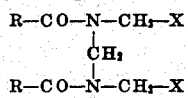

wherein R is an aliphatic hydrocarbon radical containing at least 7 carbon atoms and X is a halogen, to combine with a tertiary amine selected from the group consisting of aliphatic and heterocyclic tertiary amines.

3. A water-repellency agent consisting of substantially pure N:N - di - (N' - chloro - pyridinomethyl) -distearyldiaminomethane.

4. A water-repellency agent consisting of substantially pure N:N-di-(N'-chloro-triethylammoniomethyl)-distearyldiaminomethane.

5. Organic ammonium compounds, useful as water-repellency agents, of the formula

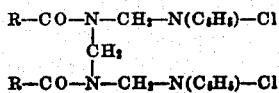

wherein R is an aliphatic hydrocarbon radical containing at least 7 carbon atoms, and $N(C_5H_5)$ stands for the pyridine radical.

6. Process for the manufacture of organic ammonium compounds which comprises causing a chloro-methyl compound of the formula

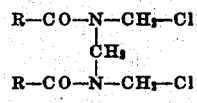

wherein R is an aliphatic hydrocarbon radical containing at least 7 carbon atoms, to combine with pyridine.

7. Quaternary ammonium compounds having the formula:

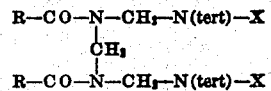

in which R is an aliphatic radical of at least 7 carbon atoms, X is a halogen and N(tert) is an aliphatic tertiary amine.

MAURICE ARTHUR THOROLD ROGERS.